Nov. 21, 1950 C. E. GOSSLING 2,530,871
LINEAR ACTUATOR
Filed Nov. 24, 1948 2 Sheets-Sheet 1
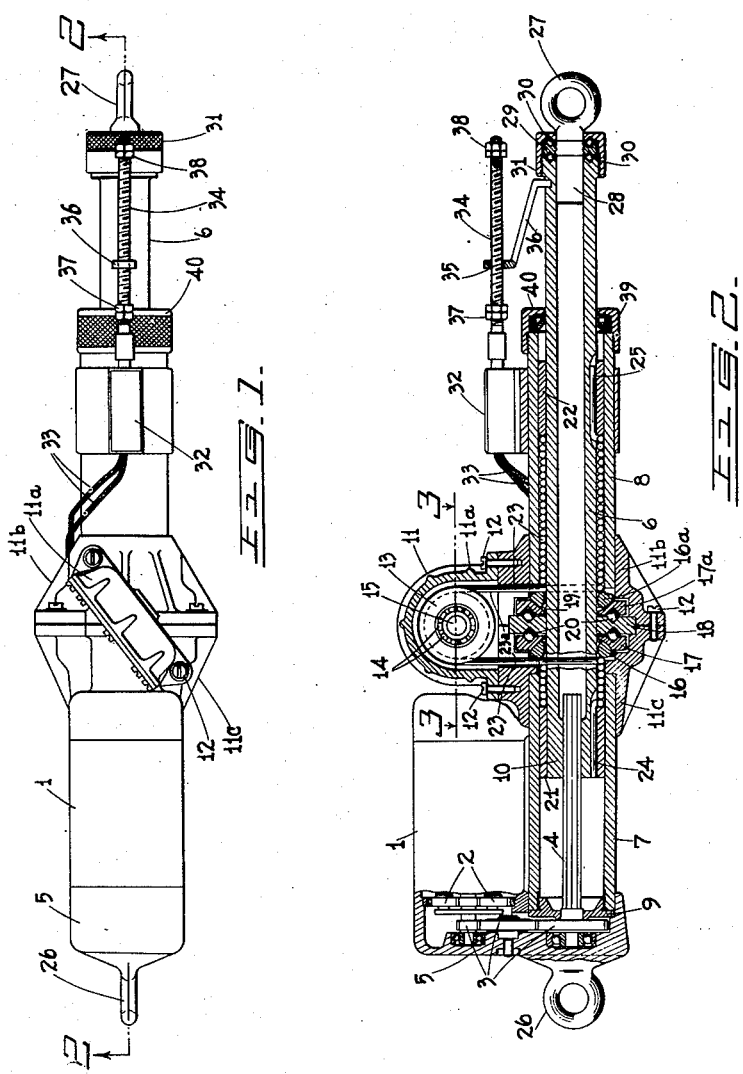
Inventor
C. E. Gossling
By
Stason Downing Seebold
Attorneys Patented Nov. 21, 1950

2,530,871

UNITED STATES PATENT OFFICE 2,530,871

LINEAR ACTUATOR

Clement Elphick Gossling, Winnipeg, Manitoba, Canada, assignor to Hudson's Bay Company, London, England, a corporation of England Application November 24, 1948, Serial No. 61,878

4 Claims. (Cl. 74—25)

The present invention relates to means of converting rotary motion into linear motion.

The use of thrust devices, particularly in aircraft, has increased considerably in recent years. In many cases such "linear actuators," as they have come to be known, are of hydraulic operation but there has been a tendency to replace them with electrically-driven devices, usually consisting of an electric motor, some form of reduction gearing and slippage control, together with various forms of screw and nut construction, this having been the obvious and well-tried principle. In most cases these screws and nuts are of accurately ground form in order that their efficiency may be as high as possible. Sometimes balls are used between the screw and the nut with the object of increasing this efficiency still further. It is a difficult and costly process to manufacture these components, particularly the ground threaded form necessary within the hardened steel nuts. The actual load handled by these actuators is in most cases fairly moderate and the present invention is being put forward as a means of making a simplified form of actuator and reducing manufacturing costs, also providing a basis whereby actuators of varying lengths of stroke can be readily constructed without modification to the basic mechanism of the unit.

It is the object of the present invention to make a linear actuator, relatively simple in design but efficient in operation, at a relatively low cost. In making the present invention it will be unnecessary to resort to the use of the delicately and intricately machined parts that are features of the prior art.

The novel details of construction and combination of parts will be described below with reference to the drawings which illustrate one form of the invention by way of example, and the invention will be particularly pointed out in the appended claims.

The following drawings will be referred to:

Figure 1 is a plan view;

Figure 2 is a section along line 2—2 in Figure 1 with the pulley-housing rotated through approximately 38° for the sake of clarity;

Figure 3:
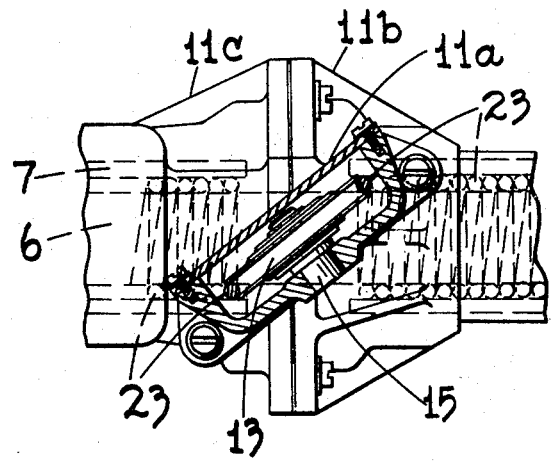
Figure 3 is a partial section on line 3—3 of Figure 2.

An electric motor 1 drives through a set of reduction gears of any orthodox construction, in the present case shown as a preliminary epicyclic train 2, with a connecting spur-reduction 3 which transmits rotary motion to a drive-shaft 4 which may be squared, splined or keyed. The gearing is situated within a housing 5 which, if desired, may be unitary with the motor casing. The shaft 4 and a hollow spindle 6 are situated within coaxial tubular casings 7 and 8. One end of casing 7 is secured to the gearing-housing 5 in any suitable manner and is closed by means of a circular plate 9. The left hand end of the spindle 6 is formed with a boss 10 which has a longitudinal aperture engaged by the shaft 4 in such a manner that the shaft can drive the spindle, while the latter is capable of longitudinal movement with respect to the shaft 4. The motor 1 may rest on and be secured to the casing 7.

Arranged between and rigidly connecting the casings 7 and 8 is a housing 11 shown in three sections 11a, 11b and 11c; the sections being fastened together by means of bolts 12. Located within the upwardly projecting part 11a of the housing 11 is a pulley 13 mounted on bearings 14 carried by a shaft 15. Located within the lower part of the housing 11 is a double thrust-bearing composed of rings 16 and 16a abutting against bearing races 17 and 17a which coact with a common central bearing race 18. The rings 16 and 16a are generally frustum-shaped in cross section and each extends into a concave depression 19; each of the races 17 and 17a having such a depression. The ring 16 and the bearing race 17 bear against each other; they are free to rotate together in either a clock-wise or a counter-clockwise direction and the same is true of ring 16a and races 17a. The rings 16 and 16a and the races 17 and 17a rotate round the spindle 6 but each ring with its corresponding race may rotate independently of the other ring and race and in opposite directions. Bearing race 18 encircles the spindle 6 and because of ball bearings 20 may rotate independently of bearing races 17 and 17a and the spindle 6.

Figure 4:
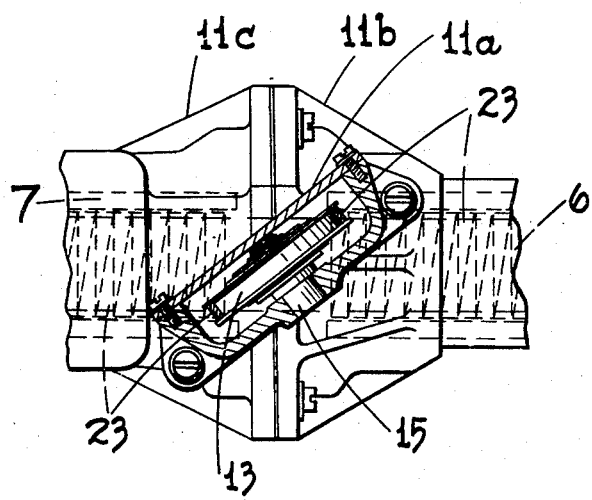
Figure 4 is a sectional view similar to Figure 3 but showing a modification.

Bearing sleeves 21 and 22 are provided on the spindle 6, the former being within the casing 7 and the latter within the casing 8. A flexible member 23 is secured at its ends to the spindle 6 as indicated at 24 and 25. The member 23 may be a rope, or cable as shown in Figures 2 and 3, or a flat metal strip as indicated in Figure 4. This member 23 is wound around either end of the spindle 6 in a helical fashion. The cable 23 is so arranged that a part of it intermediate its ends is passed over the pulley 13.

It will be seen from Figure 3 that the axis of the pulley 13 is arranged at an angle with respect to the axis of the casings 7 and 8 in such a manner that the two coiled sections of the member 23 can be wound in the same direction on the spindle 6. The section 11a of the housing 11 is correspondingly disposed at an angle with respect to the casings 7 and 8 and the diameter of the pulley 13 is such that the vertical parts 23a of the member 23, between the coiled sections of the member 23 and the pulley 13, are parallel to each other and tangential with respect to the pulley. The coiled sections always fill the tubular spaces between the bearing sleeve 21 and the outer surface of the ring 16 and between the sleeve 22 and the outer surface of the ring 16a. Thus in operation, there will be two constantly moving and similarly wound coils of the member 23, one abutting the outer extremities of the ring 16 and the other abutting the ring 16a, thus preventing any lost motion or end-play in the spindle 6.

The actuator may be anchored by means of an eye 26 and may transmit linear motion through, for example, a rotatable eye 27 carried by a short shaft or shank 28 projecting into the end of the spindle 6. A double thrust bearing is preferably provided which may conveniently consist of a race 29 formed on the shank 28 and ball bearings 30 arranged on both sides of the race 29, the whole bearing being held in place by means of a cap 31 screwed onto the end of the spindle 6.

The clearances between the spindle and the casings 7 and 8 are so arranged that it would be impossible for the cable 23 to occupy any radial or axial position other than that shown. In other words the coils cannot climb one on top of another and spoil the smooth operation of the device. As the spindle 6 is rotated through gearing 3 and shaft 4 the cable 23 will be paid out from one end of the spindle 6, pass over the pulley 13 and an equal amount of cable will be wound onto the opposite end of the spindle 6 thereby causing an end thrust to be developed which is transmitted through the bearing and eye 24 at the other end to the point at which the pressure is required to be applied. Through this action the spindle will be caused to move either to the right or to the left, depending on the direction in which it is rotating.

Switching of the motor 1 to change the direction of the spindle 6 may be done manually or automatically. A form of automatic switching has been indicated diagrammatically. A limit switch 32 is secured for example, to the casing 8 and is connected to the motor 1 through wires 33. A switch-operating rod 34 extends horizontally from the switch 33. The rod 34 extends through an opening 35 in a supporting member 36 which is carried by spindle 6. Adjustably secured to the rod 34 on opposite sides of the member 36, are suitably spaced stops 37 and 38. In operation the member 36 moves either to right or left with the spindle 6 and as it comes into contact with one or other of the stops 37 and 38 it operates the switch 32 through which the motor is stopped and later, when necessary, started in the reverse direction, thereby reversing the direction of movement of the spindle.

Preferably the free end of the casing 8 is closed by means of any suitable packing 39 held in place by a cap 40 screwed onto the casing 8.

As previously indicated the member 23 may be of several forms. For instance, it can be in the form of stranded wire rope or it can be, as indicated in Figure 4, in the form of a flat steel strip, the clearances of course having to be arranged accordingly. It will also be realised that in the case of smaller actuators requiring a very high reduction between the motor and the axial movements of the spindle, the use of small-gauge material for the member 23 will result in the same effect being achieved as if an extremely fine pitch screw were employed. The construction thereby achieved would be much more robust than if the screws were used.

If desired also, it would be possible to employ cords of non-metallic material, where the load conditions are suitable and the lack of exact positive relationship is acceptable.

Lubrication difficulties are almost eliminated by the use of this device. Overloaded clutches and limit switches are normally fitted to such units and can readily be incorporated, if desired.

The foregoing description and accompanying drawings are given by way of example only and any modifications within the scope of the appended claims may be resorted to.

The embodiments of the invention in which an exclusive property or privilege is claimed are defined as follows:

1. A device for converting rotary motion into linear motion, comprising a tubular casing, a spindle rotatable within said casing, spindle-rotating means, flexible spindle-propelling means secured to and spirally encircling said spindle over spaced-apart portions of its length, and means for reversing the direction of rotation of said spirals.

2. A device as claimed in claim 1, comprising in addition anchoring emans for said device; linear motion transmitting-means secured to one end of said spindle and articulated therewith, means for limiting the linear distance traversed by said spindle and in conjunction therewith electrically-operated means for reversing the direction of rotation of said spindle.

3. A device for converting rotary motion into linear motion comprising in combination a tubular casing, a spindle rotatable within said casing, a flexible spindle-propelling member secured at its ends to said spindle, sections of said member encircling spaced-apart portions of said spindle, and means for transferring said member from one section of said spindle to the other when the spindle is rotated.

4. A device for converting rotary movement into linear motion comprising an electric motor, a shaft driven by said motor in either direction through reduction gearing, a tubular casing, having an enlarged portion between its ends, a pulley in said enlarged portion, a spindle in said housing rotatable by said shaft and capable of axial movement in said casing, a double thrust-bearing freely mounted on said spindle within said enlarged portion, and a flexible member secured at its ends to said spindle at points adjacent the ends thereof, said flexible member being wound in tight coils along the length of said spindle except at the said enlarged portion at which portion the flexible member passes over said pulley, the loop of the flexible member which passes over the pulley being arranged to bear against said double thrust bearing at opposite sides thereof.

CLEMENT ELPHICK GOSSLING.

REFERENCES CITED

The following references are of record in the file of this patent:

UNITED STATES PATENTS

| Number | Name | Date |
|---|---|---|
| 2,241,142 | Kvolheim | May 6, 1941 |
| 2,441,092 | Weathers | May 4, 1948 |